(12) United States Patent
Okabayashi

(10) Patent No.: US 8,457,327 B2
(45) Date of Patent: Jun. 4, 2013

(54) MIXER AND COMMUNICATION CONNECTION SETTING METHOD THEREFOR

(75) Inventor: Masaaki Okabayashi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1545 days.

(21) Appl. No.: 11/891,254

(22) Filed: Aug. 8, 2007

(65) Prior Publication Data

US 2008/0175413 A1    Jul. 24, 2008

(30) Foreign Application Priority Data

Aug. 10, 2006   (JP) ................................ 2006-218835

(51) Int. Cl.
*H04B 1/00*    (2006.01)
(52) U.S. Cl.
USPC ................ 381/119; 381/118; 370/395.52
(58) Field of Classification Search
USPC ............... 381/119, 118, 26, 91, 77, 111, 157; 370/395.52, 395.2, 395.5, 395.1
See application file for complete search history.

(56) References Cited

U.S. PATENT DOCUMENTS 6,218,971 B1 * 4/2001 Sugihara ........................ 341/110
7,245,727 B2 * 7/2007 Cresci et al. ................... 381/119
2003/0223604 A1 * 12/2003 Nakagawa ..................... 381/311
2004/0106398 A1 * 6/2004 Statham et al. ............... 455/420
2012/0027230 A1   2/2012 Okabayashi

FOREIGN PATENT DOCUMENTS

JP    2005033521    2/2005

OTHER PUBLICATIONS

Japanese Office Action, mailed Aug. 19, 2008.
Digital Mixing Console M7CL Owner's Manual, Yamaha Corporation, Japan , 2005.

* cited by examiner

*Primary Examiner* — Xu Mei
*Assistant Examiner* — Con P Tran
(74) *Attorney, Agent, or Firm* — Morrison & Foerster LLP

(57) ABSTRACT

Mixer and one or more external devices, related to audio signal processing, are interconnected via a communication network, such as a LAN. For a particular one of the external devices for which communication with the mixer via the communication network is to be established, a network address unique to the particular external device and a communication protocol to be used for data communication with the particular external device are designated by entry operation by a user. Logical connection is established such that data communication is performed, in accordance with the designated communication protocol, between the mixer and the particular external device corresponding to the designated network address. Thus, data communication is performed, via the communication network, between the mixer and the particular external device for which the logical connection has been established.

10 Claims, 7 Drawing Sheets

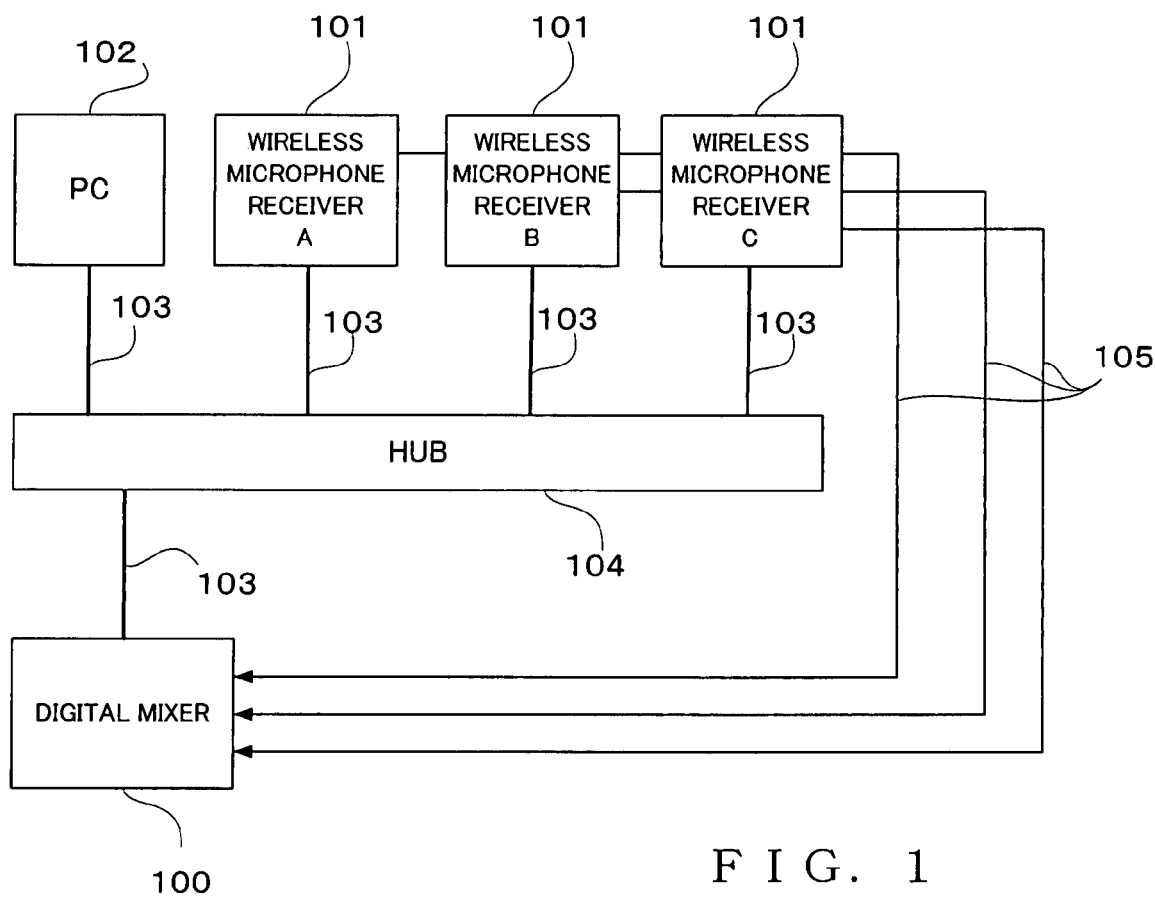
F I G. 1

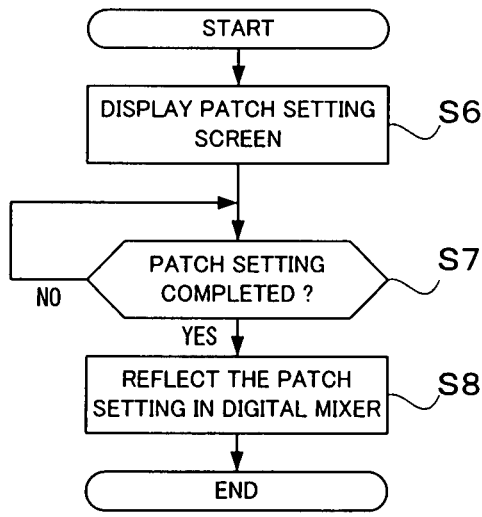
F I G. 8
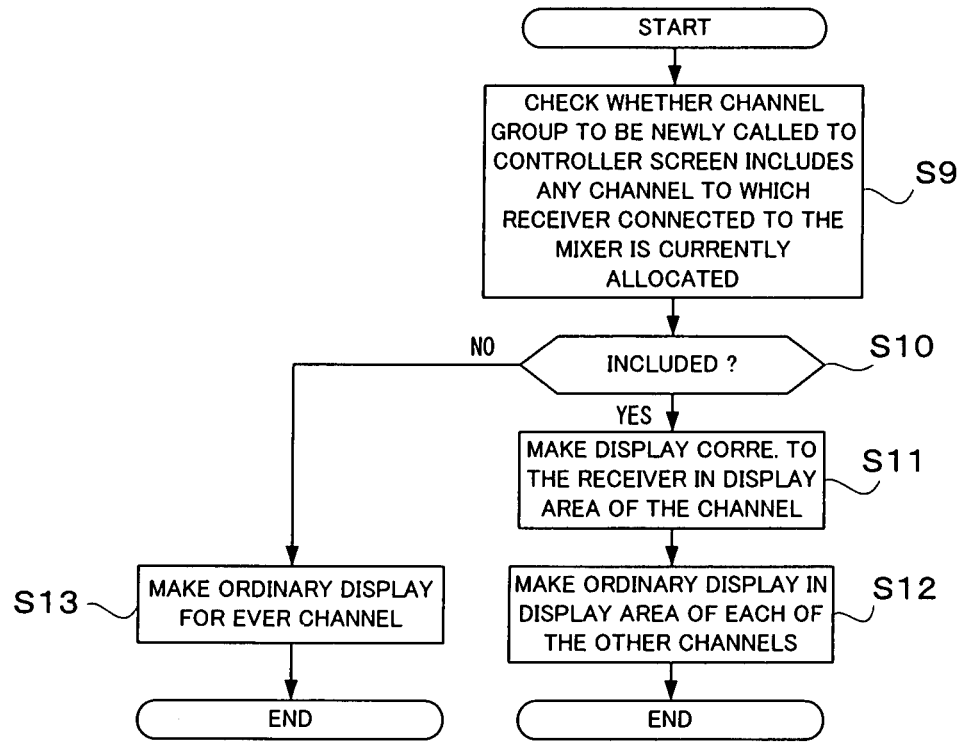
F I G. 9

MIXER AND COMMUNICATION CONNECTION SETTING METHOD THEREFOR

BACKGROUND OF THE INVENTION

The present invention relates to communication control/setting for communicating control data between an audio mixer and an external device related to audio signal processing.

Among the various conventionally-known digital mixers are ones which are provided with a terminal (remote terminal) for connecting a particular external device to the mixer. For example, a head amplifier (HA) marketed by the assignee of the instant application under the trade name "AD8HR" is connectable, via a remote terminal, to a digital mixer marketed by the same assignee of the instant application under the trade name "M7CL". Heretofore, it has been conventional to fixedly set, at a designing phase or stage of the mixer, a dedicated communication protocol for performing communication of control data between an external device to be connected to a remote terminal and the mixer. Thus, control data can be communicated between the external device and the mixer, by a user (human operator) of the mixer only connecting the external device to the remote terminal of the mixer without performing particular communication setting operation. Further, various settings for the external device, such as a head amplifier (HA) can be performed by the mixer via the remote terminal. However, with the communication protocol fixed in advance at the designing phase of the mixer, external devices connectable to the remote terminal would be limited only to particular products that are compatible with the communication protocol (see, for example, http://www2.yamaha.co.jp/manual/pdf/pa/japan/mixers/m7cl_ja_om.pdf, which will hereinafter be referred to as "relevant non-patent literature").

In a case where a wireless microphone is used as an audio signal input source to a mixer, a wireless microphone receiver that wirelessly receives input from the wireless microphone is connected to the mixer via an audio cable so that audio signals received by the receiver from the wireless microphone are supplied to the mixer over the audio cable.

In the case where a wireless microphone is employed, it is necessary to monitor states of the wireless microphone, such as remaining battery power, communication frequency band, communication condition and signal gain level or microphone level, in preparation for unforeseen troubles, such as battery power exhaustion and deterioration of the communication condition of the microphone. For such purposes, the wireless microphone receiver possesses control data indicative of states of the wireless microphone (such as remaining battery power, communication frequency band, communication condition and microphone level), so that monitoring of states of the wireless microphone and setting of various parameters, such as setting of a communication frequency band, microphone level and name of the microphone, can be performed by the wireless microphone receiver.

Further, by connecting a personal computer (PC), which executes a wireless-microphone monitoring application program, to the wireless microphone receiver via a LAN cable or the like and transferring control data of the wireless microphone to the PC, it is possible to perform monitoring of states of the wireless microphone and setting of various parameters can also be performed by the PC.

Because, with the digital mixer disclosed in the above-described relevant non-patent literature, external devices connectable to the remote terminal are limited only to particular products that are compatible with the communication protocol as set forth above, it has been impossible to connect a wireless microphone receiver to the mixer via the remote terminal, i.e. to connect the wireless microphone receiver and mixer in such a manner that control data can be communicated between the receiver and the mixer. As a consequence, monitoring of states of a wireless microphone, setting of various parameters of the wireless microphone, etc. can not be performed in the disclosed digital mixer.

Further, generally, in sound systems in concert halls etc., a wireless microphone receiver is installed near a wireless microphone (e.g., on a side of a stage) and remotely from an installed position of a mixer, and, because a wireless-microphone monitoring application program has a high technical specialty or technicality, it can not be operated easily by a person other than a specialized human operator (e.g., mixer operator). Therefore, monitoring of states of the wireless microphone, setting of various parameters of the wireless microphone, etc. have been operation performed by a human operator specialized in the wireless microphone different from the mixer operator.

If a suitable communication protocol is defined in advance for use in communication of control data between a digital mixer and an external device, such as a wireless microphone receiver, communication of control data may be performed between the digital mixer and the wireless microphone receiver via a communication network, such as a LAN. However, this approach can be applied only to particular devices (such as device of a particular model or of a particular manufacture) compatible with the predefined communication protocol. Besides, various external devices (such as head amplifiers, wireless microphone receivers and power amplifiers) are manufactured/marketed by many manufacturers. Therefore, fixedly setting a variety of communication protocols, to be used for external devices of various models and manufacturers, in association with such external devices of various models and manufacturers in order to sufficiently deal with a variety of currently-available external devices would take extremely great amounts of time and labor and extremely high cost.

SUMMARY OF THE INVENTION

In view of the foregoing, it is an object of the present invention to allow control data to be communicated, via a communication network such as a LAN, between a mixer and a desired external device related to audio signal processing.

In order to accomplish the above-mentioned object, the present invention provides an improved mixer, which comprises: a connection section that connects one or more external devices, related to audio signal processing, to the mixer via a communication network; a designation section that, for a particular one of the external devices for which communication with the mixer via the communication network is to be established, designates, in response to entry operation by a user, a network address unique to the particular external device and a communication protocol to be used for data communication with the particular external device; a logical connection establishment section that establishes logical connection such that data communication is performed, in accordance with the communication protocol designated via the designation section, between the mixer and the particular external device corresponding to the network address designated via the designation section. Thus, data communication is performed, via the communication network, between the mixer and the particular external device for which the logical connection has been established.

According to the present invention, the mixer is constructed in such a manner that, for a particular one of the external devices for which communication with the mixer via the communication network is to be established, a network address unique to the particular external device and a communication protocol to be used for data communication with the particular external device can be designated by input or entry operation by the user, and logical connection is established such that data communication is performed, in accordance with the designated communication protocol, between the mixer and the particular external device corresponding to the designated network address. Thus, data communication can be performed, via the communication network, between the mixer and the particular external device for which the logical connection has been established. For example, in a case where a desired external device, such as a wireless microphone receiver, has been connected to the mixer via a communication network, such as a LAN, logical connection necessary for data communication can be established by the user designating, through his or her entry operation, a network address of the desired external device and a communication protocol to be used for the desired external device, so that the mixer can transmit or receive necessary control data to or from the desired external device. Thus, the human operator (user) of the mixer can advantageously monitor states of the connected external device and set parameters of the external device, via the mixer. Further, because communication is established, in accordance with the user-designated communication protocol, only between the mixer and the user-designated external device, there is no need to fixedly set in advance, at a designing phase of the mixer, correspondency between individual particular external devices and communication protocols to be used in the external devices. As a consequence, control data of the external device, related to audio signal processing, can be communicated via the communication network, such as a LAN, with reduced amounts of time and labor and reduced cost.

In one embodiment, the designation section displays, on a display device, an image for prompting the user to enter a network address and designates the network address of the particular external device in response to the user entering a network address. The designation section also displays a list of a plurality of communication protocols on the display device, prompts the user to select any one of the communication protocols from the list and designates the communication protocol, selected by the user from the list, as the communication protocol to be used for data communication with the particular external device.

In one embodiment, the mixer further comprises a display control section that receives data indicative of a state of the particular external device, for which the logical connection has been established, from the particular external device via the communication network and the connection section and causes the display device to display the state of the particular external device on the basis of the received data indicative of a state of the particular external device.

The present invention may be constructed and implemented not only as the apparatus invention as discussed above but also as a method invention. Also, the present invention may be arranged and implemented as a software program for execution by a processor such as a computer or DSP, as well as a storage medium storing such a aware program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which:

FIG. 1 is a block diagram showing an example configuration of a network including a digital mixer in accordance with an embodiment of the present invention;

FIG. 8 is a flow chart showing an example operational sequence of patch setting processing performed in the mixer;

FIG. 9 is a flow chart showing an example operational sequence of display switching processing performed in the mixer.

DETAILED DESCRIPTION OF THE EMBODIMENTS

Figure 2:
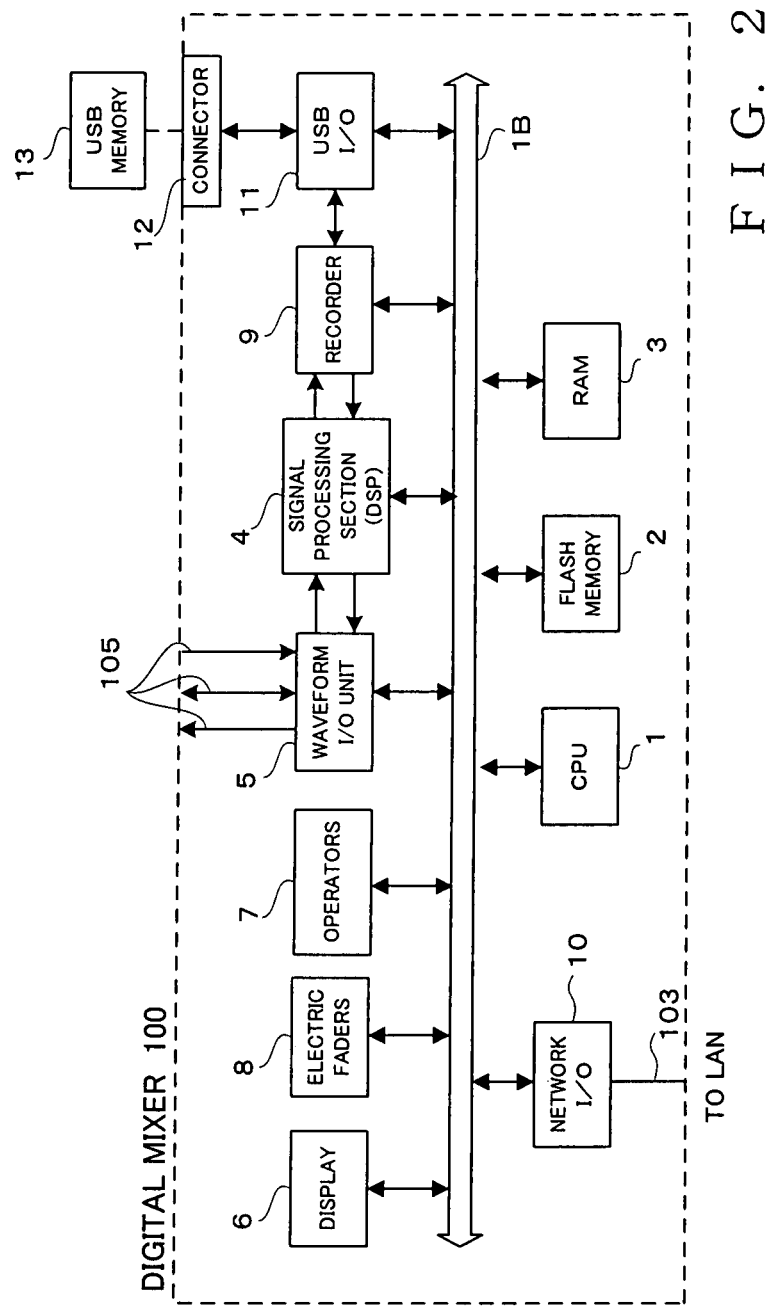
FIG. 2 is a block diagram showing an example electric hardware setup of the digital mixer according to the embodiment of the invention.

Now, an embodiment of the present invention will be described below in relation to the digital mixer of the present invention having a novel communication setting function.

FIG. 1 is a block diagram showing an example configuration of a local area network (LAN) including a digital mixer in accordance with an embodiment of the present invention. In FIG. 1, each of various devices, including the digital mixer 100, a plurality of wireless microphone receivers 101 and personal computer (PC) 102, has a network interface compliant with a general-purpose network standard, such as the Ethernet (registered trademark) standard, and is connected to a hub 104 via a LAN cable 103 connected to a network interface of that device. Namely, the LAN including the digital mixer 100 is composed of the various devices communicatably connected with one another via the hub 104.

The plurality of (three in FIG. 1) wireless microphone receivers 101 are each a device that wirelessly receives audio signals input via a corresponding wireless microphone (not shown). The wireless microphone receivers 101 may be of different models and/or different manufacturers. In FIG. 1, suffixes "A" to "C" are added to the blocks of the wireless microphone receivers 101 to distinguish among the receivers 101. Each of the wireless microphone receivers 101 is connected via a respective audio cable 105 to the mixer 100, so that each audio signal received by each of the wireless microphone receivers 101 from the corresponding wireless microphone is supplied to the mixer 100 over the audio cable 105.

Data indicative of states of the wireless microphones (for convenience of description, such data will hereinafter be referred to as "control data" to distinguish from audio signal data) are communicated between the mixer 100 and the plurality of wireless microphone receivers 101. The control data of each of the microphones are indicative of, for example, remaining battery power, wireless communication frequency band, wireless communication condition and audio signal gain level of the individual microphone; the control data may be indicative of at least one of such states of the microphone. In the instant embodiment, data are communicated over the LAN in packets each including transmitted-to (i.e., transmission destination) and transmitted-from (i.e., transmission source) addresses in addition to the body of data.

Each of the devices, i.e. mixer 100, wireless microphone receivers 101 and personal computer 102, is assigned a unique identification number (IP address) on the LAN, and such an IP address is used as transmission destination and transmission source addresses in data communication via the LAN. The IP address of each of the devices may be either automatically assigned or set to the device when the device has been connected to the LAN, or manually set by the user. According to the present invention, as will be later described in detail, communication of control data can be performed between the mixer 100 and any one of the microphone receivers 101 via the LAN, by the user (human operator) of the mixer 100 designating an IP address of the device (microphone receiver) for which communication with the mixer 100 via the LAN is to be established and a communication protocol to be used for the communication with the device. In this way, states of each of the microphones corresponding to the wireless microphone receivers 100, such as remaining battery power, wireless communication frequency band, wireless communication condition and audio signal gain level of the microphone can be monitored/set via the mixer 100 (i.e., on the mixer side).

Further, the PC 102 executes a remote controlling software program to remote-control the mixer 100. Namely, because the communication protocol for communication between the PC 102 and the mixer 100 via the LAN is predefined by the remote controlling software program, communication of control data can be performed between the PC 102 and the mixer 100, without the user performing particular setting operation, in generally the same manner as in the conventionally-known technique.

FIG. 2 is a block diagram showing an example electric hardware setup of the digital mixer 100. The digital mixer 100 includes a CPU 1, a flash memory 2, a RAM 3, a signal processing section (DSP) 4, a waveform input/output interface (waveform I/O) unit 5, a display 6, various operators 7, electric faders 8, a recorder 9, a network interface (I/O) 10 and a USB interface (I/O), and these components are connected with one another via a bus IB.

The network I/O 10 comprises, for example, a network interface of the Ethernet (registered trademark) standard. The mixer 100 is connected to the hub 104 via the LAN cable 103 connected to the network I/O 10, and the mixer 100 is communicatably connected, via the hub 10, with other devices (wireless microphone receivers 101 and PC 102 in the illustrated example of FIG. 1). Further, a USB memory 13 can be connected to the mixer 100 via a connector (USB terminal) 12 connected to the USB I/O 11. Further, the mixer 100 may be constructed in such a manner that interior data, such as setting data of the DSP 4, of the mixer 100 can be transferred to the recorder 9 and then saved/loaded into the USB memory 13.

Microcomputer, comprising the CPU 1, flash memory 2 and RAM 3, executes various control programs (including programs for carrying out the present invention as will be later described) stored in the flash memory 2 or RAM 3, to thereby control behavior of the entire mixer 100. The DSP 4 performs digital signal processing on audio signals. The waveform I/O unit 5 includes analog input ports, analog output ports, digital input ports and digital output ports, and the audio cables 105 are connected to the waveform I/O unit 5. Each analog audio signal input via the waveform I/O unit 5 is converted into digital representation and then supplied to the DSP 4, and the DSP 4 performs signal processing on the supplied digital audio signal on the basis of instructions given from the CPU 1. Digital audio signal generated as a result of the signal processing by the DSP 4 is output to the outside after being converted into analog representation via the waveform I/O 5. Further, digital audio signals can be communicated between the mixer 100 and a digital sound device connected to the mixer 100 via the waveform I/O 5.

The display 6, various operators 7 and electric faders 8 are user interfaces provided on an operation panel to be later described in relation to FIG. 4. The user can use the operators 7 and electric faders 8 to perform various operation related to mixing processing, such as operation for setting various parameters and instructing activations of various functions. Further, each of the electric faders 8 has provided therein a motor for automatically controlling an operating position of a fader knob; the operating position of the fader knob of each of the electric faders 8 is controlled on the basis of a drive signal given from the CPU 1. The display 6 shows display screens corresponding to various functions of the mixer 100, and, through the GUI function and manually-operable operators 7, the display 6 can be used, for example, for making settings related to the entire system and settings of parameters for each of the functions. As an example, the display 6 may comprise a touch-panel type liquid crystal display so that operational input can be performed by the user contacting the screen.

Figure 3:
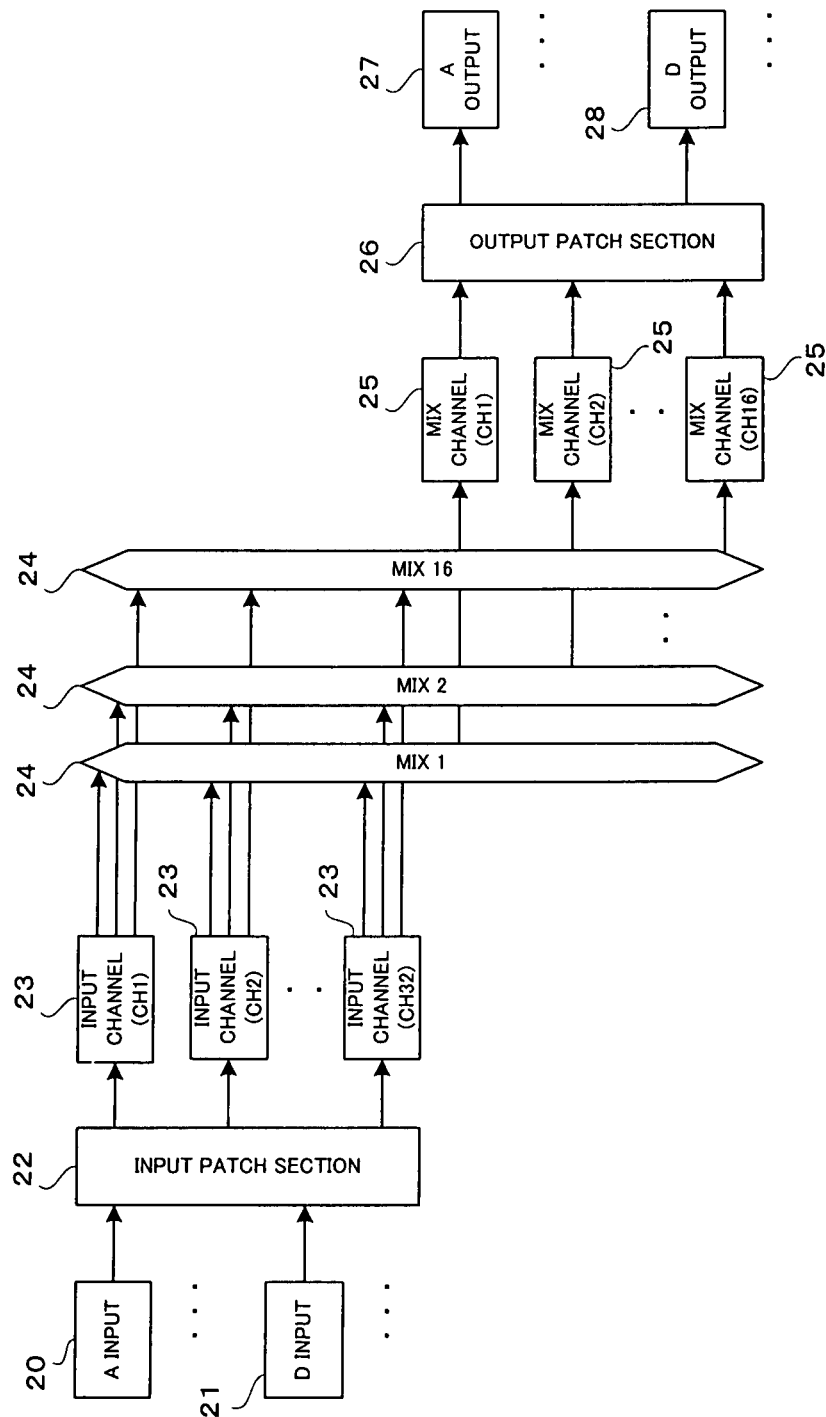
FIG. 3 is a functional block diagram outlining example signal processing arrangements in the mixer according to the embodiment of the invention.

FIG. 3 is a block diagram outlining example arrangements for signal processing performed by the DSP 4 on the audio signals. As shown, the digital mixer 100 includes a plurality of analog input ports (A inputs) 20 for inputting analog audio signals, and a plurality of digital input ports (D inputs) 21 for inputting digital audio signals. Each of the audio cables 105 for transferring audio signals from the wireless microphone receivers 101 shown in FIG. 1 is connected to any one of the A inputs 20.

Input patch section 22 selectively connects each of the input ports (A inputs 20 or D inputs 21) to any one of a plurality of input channels 23 to thereby allocate the signal from each of the input ports (A inputs 20 or D inputs 21) to any one of the input channels 23. Further, data indicative of the connections in the input patch section 22 between the individual input channels 23 and the input ports are stored as "patch data" in a suitable memory, such as the flash memory 2 or RAM 3. Note that, in this specification, associating and connecting the input ports and the input channels or associating and connecting the output ports and the output channels are referred to as "patch".

The plurality of input channels 23 (in the illustrated example, 32 input channels CH1-CH32) each include: parameter setting sections for setting values of parameters, such as limiter, compressor, equalizer, fader and panning parameters, to be applied to a digital audio signal allocated via the corresponding input port; an output destination selection section for turning on/off outputs to individual buses; and a send level adjustment section for adjusting output levels to the individual buses; thus, characteristics and level of the audio signal input to each of the input channels 23 are adjusted on the basis of parameter values set by the user via the parameter setting sections. Signal output side of each of the input channels 23 is connected to a predetermined plurality of mixing buses 24 (in the illustrated example, 16 mixing buses mix1-mix16), and the user can transmit an output signal of each of the input channels 23 to desired ones of the mixing buses 24. Each of the mixing buses 24 mixes together the signals received from the input channels 23 in accordance with mixing ratios corresponding to signal output levels of the individual input channels 23.

A plurality of (16 in the illustrated example) mixing channels (CH1-CH16) 25, corresponding to the mixing buses 24, each include: parameter setting sections for setting values of parameters, such as limiter, compressor, equalizer, fader and panning parameters, to be applied to a digital audio signal allocated via the corresponding input port; thus, characteristics and level of the audio signal input to each of the mixing buses 25 are adjusted on the basis of parameter values set by the user via the parameter setting sections. Output patch section 26 selectively connects each of the mixing channels 25 to any one of a plurality of analog output ports (A outputs) or digital output ports (D outputs) to thereby allocate the output signal of each of the mixing buses 25 to any one of the output ports (A output 27 or D output 28); thus, audio signals having been subjected user-desired mixing processing are output from the A or D output 27 or 28.

Figure 4:
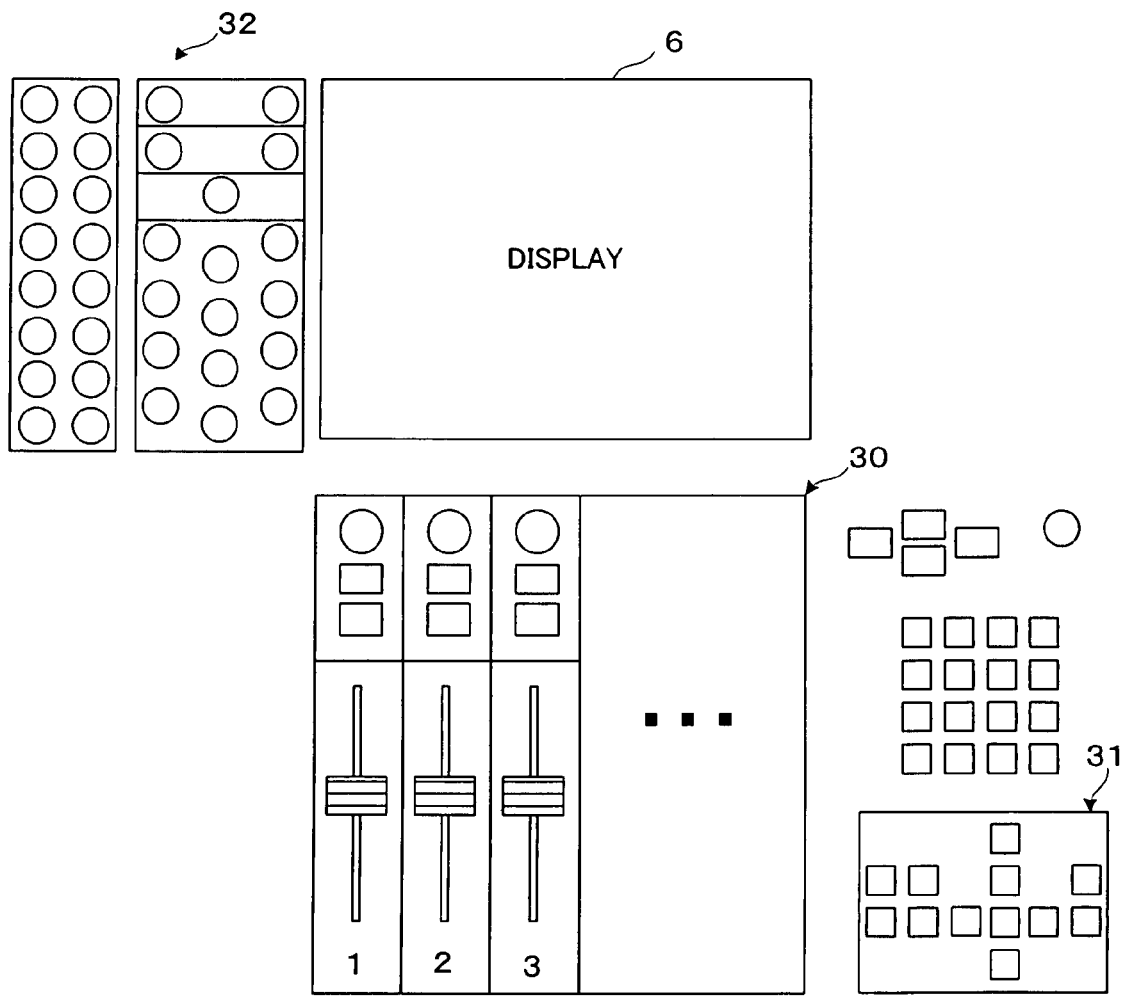
FIG. 4 is an outer appearance view showing principal sections of an operation panel of the mixer according to the embodiment of the invention.

FIG. 4 is an outer appearance view showing principal sections of the operation panel of the digital audio mixer 100. On the operation panel, there are provided the display 6 and a multiplicity of operators (corresponding to the operators 7 and electric faders 8 shown in FIG. 2). Reference numeral 30 represents a channel strip section including a plurality of channel strips. Using operators included in a navigation section 31, the user or human operator of the mixer can allocate a group of desired types of channels (e.g., input channels or mixing channels) to the channel strips of the channel strip section 30, and can manipulate principal parameters of the channels, allocated to the channel strips, using operators provided in the channel strips. Also, the user can select a desired one of the channels allocated to the channel strip section 30, can have principal parameters of the selected channel deployed to a selected channel section 32, and then can set the parameters using operators provided in the selected channel section 32.

Examples of various setting screens displayed on the display 6 include a screen for setting an IP address and communication protocol (see FIG. 7), screen for setting an input patch or output patch, controller screen for controlling principal parameters of channels currently allocated to the channel strip section 30, and a screen for setting detailed parameters for the channel deployed to the selected channel section 32.

Figure 5:
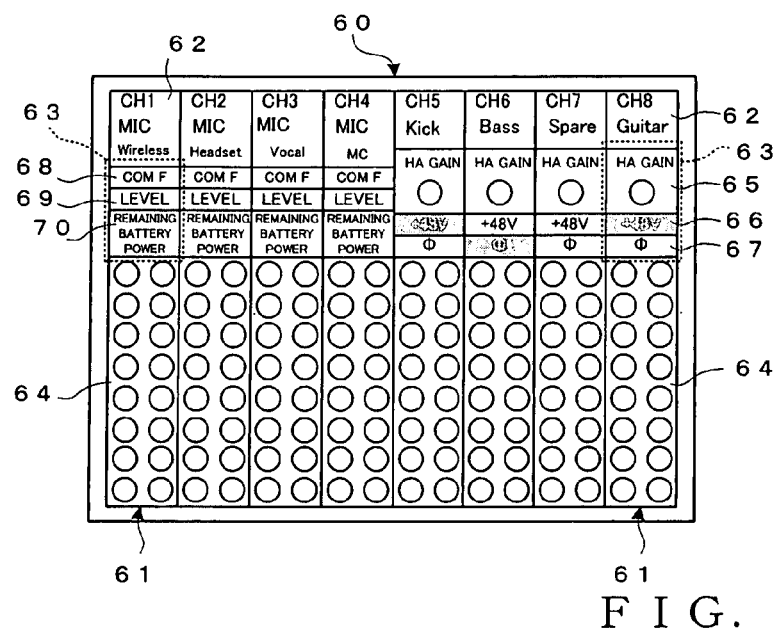
FIG. 5 is a diagram showing an example of a controller screen displayed on a display of the mixer according to the embodiment of the invention.

FIG. 5 shows an example of the controller screen. Once the user selects a group of input channels, to be allocated to the channel strip section 30, using the navigation section 31, a controller screen 60 corresponding to the selected input channel group is displayed on the display 6. On the controller screen 60, a plurality of (eight in the illustrated example) channel strip image sections 61 are displayed in corresponding relation to a plurality of physical channel strips constituting the channel strip section 30. Note that displayed positions, on the controller screen 60, of the channel strip image sections 61 are associated with installed positions, on the operation panel, of the respective physical channel strips (see FIG. 4).

Each of the channel strip image sections 61 on the controller screen 60 include a channel No./input source type display area 62 for indicating a channel number of one of the allocated input channels (in the illustrated example, one of the channel numbers "CH1" to "CH8") and type of an input source of the input channel, input source state display area 63 for indicating a state of the input source of the input channel, knob operator image display area 64 for adjusting a send level with which an audio signal of the input channel is to be sent to the mixing buses, etc. In FIG. 5, for convenience of illustration and explanation, reference numerals representing the individual areas are attached only to the channel strip image sections 61 of the input channels CH1 and CH8, and only the input source state display areas 63 of the input channels CH1 and CH8 are surrounded by dotted lines. Further, each of the channel strip image sections 61 may include, in addition to the above-mentioned, a display area for indicating principal parameters (e.g., equalizer and tone volume level parameters), etc.

In the channel No./input source type display area 62, a letter string indicative of a name of a musical instrument or performance part (such as microphone (MIC) or guitar) constituting the input source may be shown as the input source type display; alternatively, an icon symbolically representative of the musical instrument or performance part of the input source may be shown as the input source type display. In the illustrated example of FIG. 5, input from the wireless microphone receivers 101 is allocated as input sources to the channels CH1 to CH4, while input from ordinary external devices, such as wired microphones, other than the wireless microphone receivers 101, is allocated as the input sources to the channels CH5 to CH8.

Images of a head amplifier (HA) gain adjustment knob 65, ON/OFF switch of phantom power supply to the HA and phase switch 67 for switching between positive and negative phases of the allocated HA are displayed in the input source state display area 63 of each of the channels CH5 to CH8 to which input from the ordinary external devices (in this case, HAs) is allocated. In the input source state display area 63 of each of the channels CH1 to CH4 to which input from the wireless microphone receivers 101 is allocated, on the other hand, a display corresponding to the wireless microphone is made, on the basis of control data received from the wireless microphone receiver 101 via the LAN, in place of the aforementioned images of the HA gain adjustment knob 65, phantom power supply ON/OFF switch 66 and phase switch 67 displayed for the channels CH5 to CH8, as will be later described in detail. Namely, for each of the channels CH1 to CH4, states of the microphone, such as a communication frequency band (indicated as "COM F" in the figure) 68, microphone sound volume level 69 and remaining battery power 70, are displayed in the input source state display area 63. As seen in FIG. 5, the display corresponding to the wireless microphones (CH1 to CH4) and the display corresponding to the ordinary input from the Has (CH5 to CH8) are uniformized in display design, and thus, the instant embodiment can advantageously prevent impairment of aesthetic quality and operability of the screen and allow the operator of the mixer to readily monitor and set control data of the wireless microphone.

The instant embodiment may be arranged in such a manner that a setting screen can be displayed, in response to operation by the user, separately for each of the operator images or for each of display fields; this arrangement is advantageous in that detailed setting and operation can be performed on the separate setting screen.

Figure 6:
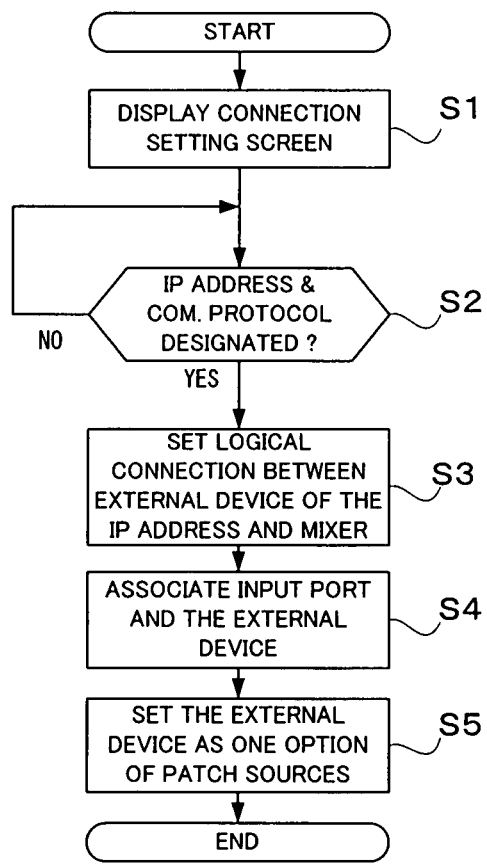
FIG. 6 is a flow chart showing an example operational sequence of connection setting processing for connecting the mixer and an external device via a LAN.

Next, a description will be given about example operational sequences of various processing performed by the microcomputer (CPU 1) of the mixer 100 for connecting and controlling the mixer 100 and a desired one of the wireless microphone receivers 101. FIG. 6 is a flow chart showing an example operational sequence of connection processing for connecting a desired one of the wireless microphone receivers 101 to the mixer 100. The connection processing is intended to logically connect a desired one of the wireless microphone receivers 101 to the mixer 100 via the LAN cable 103. Namely, the connection processing of FIG. 6 is started up once the user has given an instruction for causing the display 6 of the mixer 100 to display a connection setting screen for logically connecting the mixer 100 and the wireless microphone receiver 101.

Figure 7:
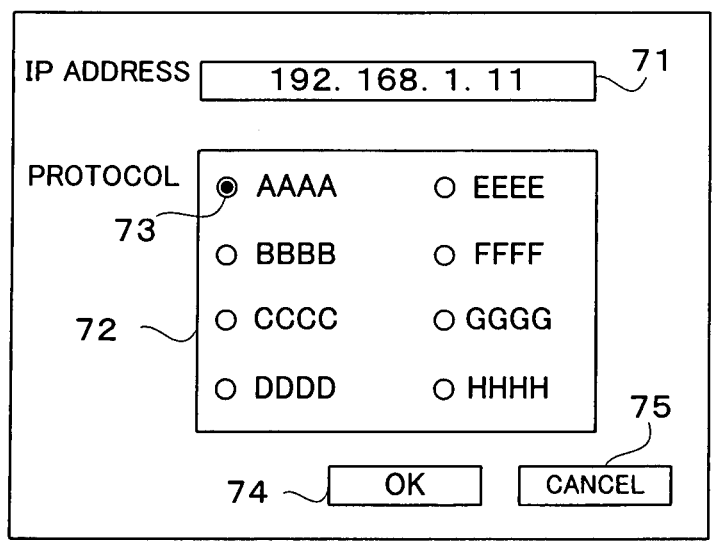
FIG. 7 is a diagram showing an example construction of a connection setting screen displayed on the display of the mixer in the above-mentioned connection setting processing.

First, at step S1, the connection setting screen is displayed on the display 6 to prompt the user (human operator) of the mixer 100 to enter the IP address and communication protocol of the external device (wireless microphone receiver 101) for which logical connection with the mixer 100 is to be set or established. Example of the connection setting screen is shown in FIG. 7, which includes an IP address entry field 71 and a communication protocol selection field 72. The user (human operator) of the mixer 100 enters or designates, by manually operating the operators 7 including a keyboard etc., the IP address of the external device (any one of the wireless microphone receivers 101 (A-C) in the illustrated example of FIG. 1), for which communication with the mixer 100 is to be established (i.e., logical connection with the mixer 100 is to be set). The IP address, as noted above, is an identification number either automatically set in response to connection, to the LAN, of the external device in question or set through manual entry by the user, and it is, for example, in the form of a numerical value of 32 bits consisting of four 8-bit groups.

In the communication protocol selection field 72 of the connection setting screen shown in FIG. 7, a plurality of different types of communication protocols are listed up (in letter strings "AAAA", "BBBB", etc. in the illustrated example of FIG. 7), and radio buttons 73 are provided in corresponding relation to the communication protocols. The user can designate one desired communication protocol, to be used for communication of control data between the mixer 100 and the device corresponding to the IP address entered in the IP address entry field 71, from the communication protocol selection field 72 by manually operating the operators 7, including the mouse or the like, to check the radio button of the desired communication protocol. Further, in FIG. 7, the user can confirm contents of settings, made via the connection setting screen, using an "OK" button 74 and cancels contents of settings, made via the connection setting screen, using a "CANCEL" button 75. Namely, according to the instant embodiment, with which communication protocol the external device corresponding to the IP address should communicate with the mixer 100 is judged by the user. Thus, the mixer 100 only has to possess information of the plurality of types of communication protocols, and association or correspondency between the external devices and the communication protocols need not be fixedly set at a designing phase of the mixer 100. As a consequence, control data can be communicated via the LAN with reduced amounts of time and labor and reduced cost. Further, with the aforementioned arrangements, it is possible to eliminate a need for preliminary communication, intended for communication control/setting, between the mixer 100 and the receiver 101 specified by the IP address, such as communication for inquiring what communication protocol the device specified by the IP address is using; thus, there can be achieved the advantageous benefit that complicated communication functions are not required of the mixer 100 that should fundamentally be a device specialized in sound signal processing and the external device (wireless microphone receiver 101) that is a communication partner of the mixer 100.

However, at least communication protocols to be used for the individual devices must be informed in advance to the user (human operation) of the mixer 100 in some way or other. The user can acquire information of the communication protocols to be used for the individual devices, by reading the instruction manuals of the devices, inquiring of the manufacturers of the devices, or otherwise. In such a manner, the user can acquire the communication protocols to be used for the individual devices and perform operation for selecting a suitable one of the acquired communication protocols. Alternatively, the user may be caused to enter any one of the acquired communication protocols, instead of selecting any one of the acquired communication protocols.

As well known, the "TCP/IP protocol" used today as a standard network protocol is built of a plurality of hierarchies corresponding to various functions. Lower-hierarchy protocol of the "TCP/IP protocol" defines direct interface functions in communication control, such as a function for accessing a network and delivering a data packet to a communication partner, while an upper-most, application-hierarchy protocol defines exchange of messages of various services and how to interpret the messages. Each "communication protocol" to be set by the user on the connection setting screen of FIG. 7 corresponds to the above-mentioned application-hierarchy protocol, and it mainly defines how to interpret control data possessed by a communication partner.

At step S2, a determination is made as to whether an IP address and communication protocol have been designated by entry operation by the user. With a YES determination at step S2, the processing proceeds to step S3, where the wireless microphone receiver 101 specified by the IP address (i.e., device having the IP address set therefor) is detected from the LAN and logical connection is automatically set between the detected wireless microphone receiver 101 and the mixer 100. Namely, a communication path is established between the detected wireless microphone receiver 101 and the mixer 100, and the mixer 100 is set to use the communication protocol, designated on the connection setting screen, to interpret data received from the wireless microphone receiver 101 logically connected to the mixer 100. In this manner, the mixer 100 is placed in a state where it can communicate with the communication-partner device or wireless microphone receiver, having the user-designated IP address, using the user-designated communication protocol.

At next step S4, the mixer 100 is caused to identify correspondency or association between the user-designated IP address and an audio signal input from the communication-partner wireless microphone receiver 101 having the IP address. Namely, the user is caused to identify which of the input ports (corresponding to the waveform I/O unit 5 of FIG. 2 or A inputs 20 of FIG. 3), to thereby associate the input port and the IP address of the communication-partner wireless microphone receiver 101. Data indicative of the thus-set association between (the IP address of) the communication-partner wireless microphone receiver 101 and the input port is recorded into a suitable memory, such as the flash memory 2 or RAM 3. In this way, the mixer 100 can identify that the audio signal input to a given input channel via the input port (waveform I/O unit 5) and control data received from the communication-partner device having the IP address pertain to the same device (i.e., same input channel). Further, at step S5, the mixer 100 is set so that the communication-partner wireless microphone receiver 101 having the IP address is displayed as a choice or option of patch sources (or patchable external devices) on a patch setting screen to be later described.

FIG. 8 is a flow chart showing an example operational sequence of patch setting processing. This patch setting processing is started up once the user gives an instruction for causing the display 6 to display the patch setting screen. The patch setting screen is a screen for allowing the user to set the input patch section 22 or output patch section 26 (FIG. 3). Display of the patch setting screen can be started, for example, by the user selecting, on the controller screen 60 of FIG. 7, the channel No./input source type display area 62 pertaining to a given channel.

At step S6, the patch setting screen is displayed on the display 6 in response to an instruction by the user, and the user is prompted to make patch setting entries. On the patch setting screen, the user performs setting for patching a desired input port (A input 20 or D input 21) to any one of the input channels 23 or for patching an output signal of one of the mixing channels 25 to a desired output port (A output 27 or D output 28). On the patch setting screen, the user can make a selection from among the names or icons of the input sources (patch sources) allocated to the input channels; the name or icon of the communication-partner wireless microphone receiver 101, set as a choice at step S5 of FIG. 6, is included in the names or icons of the input sources (patch sources). Namely, the user can select, as a patch setting choice, the external device (wireless microphone receiver 101) connected to the mixer 100 via the LAN.

Upon completion of the patch setting on the patch setting screen (YES determination at step S7), the processing moves on to step S8, where "patch data" indicative of the contents of the patch setting are recorded into a suitable memory, such as the flash memory 2 or RAM 3. At step S8, an audio signal path (contents of signal processing) in the DSP 4 is set in accordance with the contents of the patch setting so that the contents of the patch setting are reflected in the signal processing.

In a case where the controller screen 60 shown in FIG. 5 displays any input channel to which an audio signal from the external device (wireless receiver 101) connected to the mixer 100 via the LAN is allocated (e.g., any of the channels CH1-CH4 in FIG. 7), states of the wireless microphone receiver 101, different from the ordinary display of the HA in the input source state display area 63 of the channel strip image section 61 of any of the channels CH5 to CH8, are displayed in each of the input source state display areas 63 of the channel strip image sections 61 of the channels CH1 to CH4 (to which an audio signal from the wireless microphone receiver 101 is allocated).

FIG. 9 is a flow chart showing an example operational sequence of display switching processing for switching between the ordinary display (i.e., display of states of the HA) and the states of the wireless microphone receiver. This display switching processing is started up in response to a controller-screen display switching instruction, i.e. occurrence switching of the channel group to be called to the controller screen.

At step S9, it is checked whether a channel group to be newly called to the controller screen 60 includes any input channel which an audio signal from the wireless microphone receiver 101 connected to the mixer 100 via the LAN is currently allocated to. Here, it is determined, on the basis of patch setting data of each of the input channels in the channel group, via which of the input ports an audio signal from the wireless microphone receiver 101 is currently allocated to the channel. If correspondency between the channel and the input port can be identified, then it is possible to identify, on the basis of the data indicative of the correspondency between the wireless microphone receiver 101 and the input port recorded at step S4 of the connection processing of FIG. 6, to which of the input channels the audio signal from the wireless microphone receiver 101 is currently allocated.

If the channel group to be newly called to the controller screen 60 includes any input channel to which the audio signal from the wireless microphone receiver 101 connected to the mixer 100 via the LAN is currently allocated (YES determination at step S10), the processing moves on to step S11, where images to be displayed in the input source state display area 63 of the input channel are determined and the thus-determined images are displayed in the input source state display area 63. Namely, it is assumed here that images to be displayed in the input source state display area 63 of the input channel are predefined in accordance with the communication protocol designated in the connection processing of FIG. 6. In the case of the communication protocol to be used for the wireless microphone receiver 101, images of the input source state display area 63 are predefined such that states of the wireless microphone receiver 101, including a communication frequency band 68, microphone sound volume level 69 and remaining battery power 70, are displayed in the input source state display area 63 as indicated regarding the channels CH1 to CH4 in FIG. 5. In this manner, states of the wireless microphone receiver 101, including the communication frequency band 68, microphone sound volume level 69 and remaining battery power 70, are displayed in the input source state display area 63 of the input channel which the audio signal from the wireless microphone receiver 101 is currently allocated to (see FIG. 5).

At step S12, the ordinary display (i.e., display corresponding to the HA) is made for the input channel (e.g., any of the channels CH5-CH8 in FIG. 5), in the channel group to be newly called to the controller screen 60, to which the device (i.e., HA) other than the microphone receivers 101 connected via the LAN to the mixer 100 via the LAN is allocated. Images of the HA gain adjustment knob 65, ON/OFF switch of phantom power supply to the HA and switch 67 for switching between positive and negative phases of the allocated HA are displayed in the input source state display area 63 of the input channels (e.g., any of the channels CH5 to CH8 in FIG. 5).

If the channel group to be newly called to the controller screen 60 does not include any input channel to which the audio signal from the wireless microphone receiver 101 is currently allocated (NO determination at step S10), the processing branches on to step S13, where the ordinary display (i.e., display corresponding to the HA) is made for all of the input channels to be called to the controller screen 60.

Figure 10:
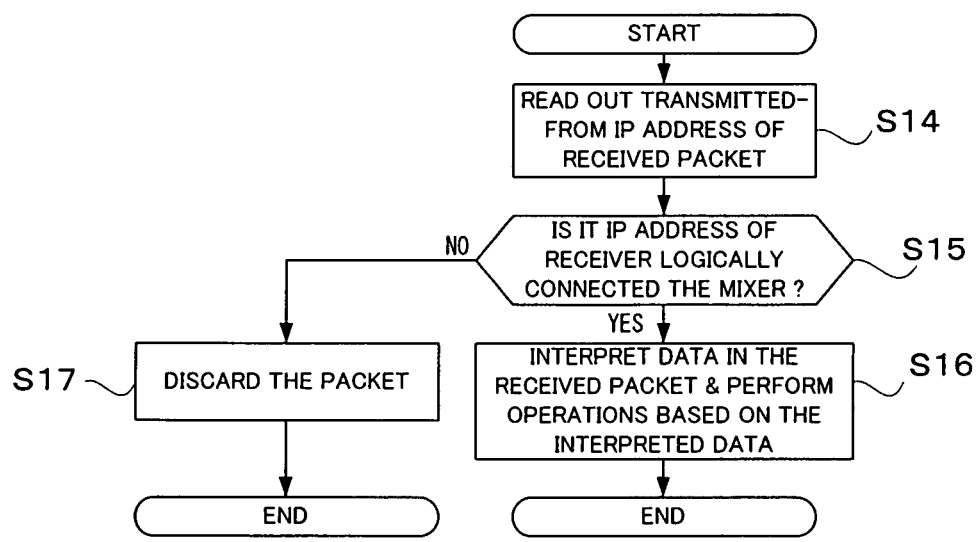
FIG. 10 is a flow chart showing an operational sequence of processing performed in the mixer for receiving a packet of control data via the LAN.

Because, by the aforementioned processing, the mixer 100 is set so that it can communicate control data (such as data indicative of remaining battery power, communication frequency band, communication condition and gain level of the microphone) with the wireless microphone receiver 101 via the LAN, the user can monitor and set states of the wireless microphone via the mixer 100. FIG. 10 is a flow chart showing an operational sequence of processing performed when the mixer 100 has received control data from the wireless microphone receiver 101. Namely, the processing of FIG. 10 is started up in response to receipt, by the mixer 100, of a packet of control data from the wireless microphone receiver via the LAN. Transmission of packets of control data from the wireless microphone receiver 101 may be performed periodically at predetermined time intervals or non-periodically (e.g., in response to detection of a change in the contents of the control data). Alternatively, the mixer 100 may request the wireless microphone receiver 101 to transmit packets of control data. Further, transmission of packets of control data may be performed by the wireless microphone receiver 101 broadcasting the packets to the LAN or by the wireless microphone receiver 101 transmitting the packets to the particular IP address of the mixer 100 (namely, to the particular communication partner). Let it be assumed here that, in the latter case, the IP address of the mixer 100 is informed in advance, in the above-described connection processing of FIG. 6, to the wireless microphone receiver 101 connected to the mixer 100.

The mixer 100 reads out the transmitted-from IP address of a packet received via the LAN, at step S14. If the read-out IP address is the IP address of a wireless microphone receiver 101 designated as a communication partner of, i.e. logically connected to, the mixer 100 (YES determination at step S15), the mixer 100 interprets the control data in the received packet in accordance with the communication protocol designated in correspondence with the read-out IP address and performs operations based on the interpreted control data at step S16. For example, the mixer 100 performs an operation for updating the display in the input source state display area 63 of the input channel associated with the IP address of the received packet. In this manner, the user can monitor, via the mixer 100, states, such as remaining battery power, wireless communication frequency band, wireless communication condition and gain level of each of the microphones corresponding to the individual wireless microphone receivers 101. If, on the other hand, the read-out IP address is an IP address of a wireless microphone receiver 101 that is not designated as a communication partner of, i.e. logically connected to, the mixer 100 (NO determination at step S15), then the received packet is discarded at step S17.

Further, the user can perform, via the input source state display area 63 of the controller screen 60 of the mixer 100, various parameter settings, such as those of a communication frequency band and microphone level and name setting, for the wireless microphone receiver 101 connected to the mixer 100. If the user has changed a state of a microphone via the mixer 100, a packet of control data corresponding to the changed content is transmitted from the mixer 100 to the wireless microphone receiver 101, corresponding the wireless microphone, in accordance with the communication protocol of the receiver 101. Then, the wireless microphone receiver 101 can interpret the packet of control data in accordance with the communication protocol of the receiver 101. Thus, the user can edit, via the mixer 100, the states of the wireless microphones corresponding to the individual wireless microphone receivers 101.

According to the instant embodiment, as described above, when the user (human operation) of the mixer 100 has designated an IP address and communication protocol of a desired communication-partner external device (e.g., wireless microphone receiver 101) on the connection setting screen shown in FIG. 7, a logical connection is established between the mixer 100 and the wireless microphone receiver 101 corresponding to the designated IP address such that control data can be communicated therebetween in accordance with the designated communication protocol. As a result, the instant embodiment of the invention advantageously allows the user to monitor the states of the corresponding wireless microphone and perform various parameter settings etc. via the mixer 100. Further, with the arrangement that communication is established, in accordance with the user-designated communication protocol, only between the mixer 100 and the user-designated wireless microphone receiver 101, there is no need to fixedly set in advance, at a designing phase of the mixer, correspondency between external devices and communication protocols used in the external devices.

Note that various operation performed by the user in the mixer 100 in the above-described embodiment may alternatively be performed by the PC 102 executing a remote control program of the mixer 100. Namely, a display corresponding to a wireless microphone receiver, similar to that made in the input source state display area 63 of the controller screen 60 shown in FIG. 5, may be made on a display of the remote-mixer-controlling PC 102, to permit monitoring of states of a corresponding wireless microphone and setting of various parameters. In such a case, communication may be performed between the remote-mixer-controlling program of the PC 102 and individual wireless microphone receivers 101 on the LAN, or between the remote-mixer-controlling program of the PC 102 and monitoring application programs of the receivers 101.

Further, whereas FIG. 1 shows the system construction where the mixer 100 and the individual wireless microphone receivers 101 are interconnected via the audio cables 105 so that audio signals are transmitted from the individual wireless microphone receivers 101 to the mixer 100 via the audio cables 105, the present invention is not so limited, and audio signals may be transmitted from the individual wireless microphone receivers 101 to the mixer 100 via the LAN (LAN cable 103), in which case the audio cables 105 interconnecting the mixer 100 and the individual wireless microphone receivers 101 may be dispensed with. Namely, data to be communicated between the mixer 100 and the external devices (wireless microphone receivers 101) via the communication network (LAN cable 103) are not limited to control data for monitoring states of the external devices as set forth above and may be control data to be transmitted from the mixer 100 to the external devices (receivers 101) for controlling the behavior of the external devices. Further, data to be communicated between the mixer 100 and the external devices (wireless microphone receivers 101) are may be audio signals.

Further, whereas the wireless microphone receivers 101 have been described as examples of the external devices connected to the mixer 100 via the LAN, the external devices connected to the mixer 100 via the LAN may be other than the wireless microphone receivers 101, such as a head amplifier, power amplifier and other devices related to sound signal processing. In such a case, audio signals to be mixed by the mixer 100 are input from the external devices to the mixer or audio signals mixed by the mixer 100 are output to the external devices, depending on the functions of the external devices.

Whereas the present invention has been described so far as an apparatus (or device) invention, the present invention is not so limited and may be arranged and implemented as a software program for causing a computer to function as a communication setting apparatus.

This application is based on, and claims priority to, Japanese Patent Application No. 2006-218835 filed on Aug. 10, 2006. The disclosure of the priority application, in its entirety, including the drawings, claims, and the specification thereof, is incorporated herein by reference.

What is claimed is:

1. A mixer comprising:
a plurality of input ports that input external device audio signals from external devices;

a connection section that connects to said mixer via a communication network, wireless microphone receivers included in the external devices that supply wireless microphone receiver audio signals to the plurality of input ports, the wireless microphone receivers receiving wireless microphone audio signals from wireless microphones and outputting the received audio signals;

an address and protocol input section that, for a particular one of the wireless microphone receivers for which communication via the communication network is to be established, inputs an Internet Protocol (IP) address unique to the particular wireless microphone receiver and a protocol of an application layer to be used for control data communication between said mixer and the particular wireless microphone receiver;

control data reception section that establishes a communication path between said mixer and the particular wireless microphone receiver corresponding to the IP address input by said address and protocol input section and receives, from the particular wireless microphone receiver, control data possessed by the particular wireless microphone receiver in accordance with the protocol of the application layer input by said address and protocol input section;

an input port setting section that sets correspondence relationship between the plurality of input ports and the wireless microphone receivers for which control data communication is to be performed by said control data reception section;

a plurality of input channels each having a plurality of channel parameters, each of the input channels performing signal processing on an input audio signal in accordance with the channel parameters and then outputting the processed audio signal;

an input patch section that defines correspondence relationship between the plurality of input ports and the plurality of input channels;

a mixing section that selectively mixes the processed audio signals input via the plurality of input channels;

an output section that outputs audio signals mixed by said mixer;

a channel strip group including a plurality of channel strips each including at least a fader, any desired ones of the plurality of input channels being allocatable to each of the plurality of channel strips;

a channel allocation section that allocates desired ones of the plurality of input channels to individual ones of the plurality of channel strips; and a display section that displays, individually for the input channels, the channel parameters related to the input channels allocated to the individual ones of the plurality of channel strips by said channel allocation section, wherein, when the input channel to be displayed on said display section is an input channel for inputting an audio signal of the input port corresponding to the particular wireless microphone receiver, said display section displays, in place of a part of the plurality of channel parameters, states of the particular wireless microphone receiver, including a state of the wireless microphone for which the particular wireless microphone receiver is currently receiving a current audio signal on the basis of the control data received by said control data reception section.

2. A mixer as claimed in claim 1 wherein said address and protocol input section displays, on a display device, an image for prompting a user to enter a network address and inputs the network address of the particular wireless microphone receiver in response to the user entering a network address, and wherein said address and protocol input section also displays a list of a plurality of communication protocols on the display device, prompts the user to select any one of the communication protocols from the list and inputs the communication protocol, selected by the user from the list, as the protocol of the application layer to be used for control data communication between said mixer and the particular wireless microphone receiver.

3. A mixer as claimed in claim 1 wherein said state of the wireless microphone is at least one of remaining battery power, wireless communication frequency band, wireless communication condition and audio signal gain level of the wireless microphone.

4. A mixer as claimed in claim 1 wherein external device audio signals to be mixed or mixed audio signals are transmitted between the external devices and said mixer via dedicated audio signal transmission paths.

5. A mixer as claimed in claim 1 wherein external device audio signals to be mixed or mixed audio signals are transmitted between the external devices and said mixer via the communication network.

6. A mixer as claimed in claim 1 wherein said address and protocol input section displays, on a display device, an image for prompting a user to enter a network address or communication protocol and inputs the network address or communication protocol of the particular wireless microphone receiver in response to the user entering a network address or communication protocol upon prompting by the image.

7. A computer-implemented method for performing a method for controlling, via a mixer, external devices connected to the mixer for supplying external device audio signals to the mixer, said mixer comprising:

a plurality of input ports that input the external device audio signals from the external devices;

a connection section that connects, to said mixer via a communication network, wireless microphone receivers included in the external devices that supply wireless microphone receiver audio signals to the plurality of input ports, the wireless microphone receivers receiving wireless microphone audio signals from wireless microphones and outputting the received audio signals;

a plurality of input channels each having a plurality of channel parameters, each of the input channels performing signal processing on an input audio signal in accordance with the channel parameters and then outputting the processed audio signal;

an input patch section that defines correspondence relationship between the plurality of input ports and the plurality of input channels;

a mixing station that selectively mixes the processed audio signals input via the plurality of input channels;

an output section that outputs audio signals mixed by said mixer;

a channel strip group including a plurality of channel strips each including at least a fader, any desired one of the plurality of input channels being allocatable to each of the plurality of channel strips;

a channel allocation section that allocates desired ones of the plurality of input channels to individual ones of the plurality of channel strips; and a display section that displays, individually for the input channels, the channel parameters, related to the input channels allocated to the individual ones of the plurality of channel strips by said channel allocation section;

said method comprising:

an address and protocol input step of, for a particular one of the wireless microphone receivers for which communication via the communication network is to be established, inputting an Internet Protocol (IP) address unique to the particular wireless microphone receiver and a protocol of an application layer to be used for control data communication between said mixer and the particular wireless microphone receiver;

a control data reception step of establishing a communication path between the mixer and the particular wireless microphone receiver corresponding to the IP address input by said address and protocol input step and receiving, from the particular wireless microphone receiver, control data possessed by the particular wireless microphone receiver in accordance with the protocol of the application layer input by said address and protocol input step;

an input port setting step of setting correspondence relationship between the plurality of input ports and the wireless microphone receivers for which control data communication is to be performed by said control data reception step; and a display control step of, when the input channel to be displayed on the display section is an input channel for inputting an audio signal of the input port corresponding to the particular wireless microphone receiver, displaying, in place of a part of the plurality of channel parameters, states of the particular wireless microphone receiver including a state of the wireless microphone for which the particular wireless microphone receiver is currently receiving a current audio signal on the basis of the control data received by said control data reception step.

8. A computer-implemented method as claimed in claim 7 wherein said address and protocol input step comprises displaying, on a display device, an image for prompting the user to enter a network address and displaying, on the display device, a list of a plurality of communication protocols to thereby prompt the user to select any one of the communication protocols from the list, and wherein said method further comprises a step of determining whether the user has entered a network address and whether the user has selected any one of the communication protocols from the list.

9. A non-transitory computer-readable storage medium containing a program executable by a computer to perform a method for controlling, via a mixer, external devices connected to the mixer for supplying external device audio signals to the mixer, said mixer comprising:

a plurality of input ports that input the external device audio signals from the external devices;

a connection section that connects, to said mixer via a communication network, wireless microphone receivers included in the external devices that supply wireless microphone receiver audio signals to the plurality of input ports, the wireless microphone receivers receiving wireless microphone audio signals from wireless microphones and outputting the received audio signals;

a plurality of input channels each having a plurality of channel parameters, each of the input channels performing signal processing on an input audio signal in accordance with the channel parameters and then outputting the processed audio signal;

an input patch section that defines correspondence relationship between the plurality of input ports and the plurality of input channels;

a mixing station that selectively mixes the processed audio signals input via the plurality of input channels;

an output section that outputs audio signals mixed by said mixer;

a channel strip group including a plurality of channel strips each including at least a fader, any desired one of the plurality of input channels being allocatable to each of the plurality of channel strips;

a channel allocation section that allocates desired ones of the plurality of input channels to individual ones of the plurality of channel strips; and a display section that displays, individually for the input channels, the channel parameters related to the input channels allocated to the individual ones of the plurality of channel strips by said channel allocation section;

said method comprising:

an address and protocol input step of, for a particular one of the wireless microphone receivers for which communication via the communication network is to be established, inputting an Internet Protocol (IP) address unique to the particular wireless microphone receiver and a protocol of an application layer to be used for control data communication between said mixer and the particular wireless microphone receiver a control data reception step of establishing a communication path between the mixer and the particular wireless microphone receiver corresponding to the IP address input by said address and protocol input step and receiving, from the particular wireless microphone receiver, control data possessed by the particular wireless microphone receiver in accordance with the protocol of the application layer input by said address and protocol input step;

an input port setting step of setting correspondence relationship between the plurality of input ports and the wireless microphone receivers for which control data communication is to be performed by said control data reception step; and a display control step of, when the input channel to be displayed on the display section is an input channel for inputting an audio signal of the input port corresponding to the particular wireless microphone receiver, displaying, in place of a part of the plurality of channel parameters, states of the particular wireless microphone receiver including a state of the wireless microphone for which the particular wireless microphone receiver is currently receiving a current audio signal on the basis of the control data received by said control data reception step.

10. A non-transitory computer-readable storage medium as claimed in claim 9 wherein said address and protocol input step comprises displaying, on a display device, an image for prompting a user to enter a network address and displaying, on the display device, a list of a plurality of communication protocols to thereby prompt the user to select any one of the communication protocols from the list, and wherein said method further comprises a step of determining whether the user has entered a network address and whether the user has selected any one of the communication protocols from the list.

* * * * *